US006792423B1

(12) United States Patent
Jeffries et al.

(10) Patent No.: US 6,792,423 B1
(45) Date of Patent: Sep. 14, 2004

(54) HYBRID LONGEST PREFIX MATCH AND FIXED MATCH SEARCHES

(75) Inventors: Clark Debs Jeffries, Durham, NC (US); Anthony Matteo Gallo, Apex, NC (US); Natarajan Vaidhyanathan, Durham, NC (US); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 09/723,717

(22) Filed: Nov. 28, 2000

(51) Int. Cl.[7] .............................................. G06T 17/30
(52) U.S. Cl. ......................... 707/6; 707/509; 707/521; 709/238
(58) Field of Search ...................... 707/6, 3, 10, 104.1, 707/206, 200, 509, 521; 341/51, 60; 711/216, 148, 179, 202; 709/202, 226, 238, 242, 245

(56) References Cited

U.S. PATENT DOCUMENTS

| 4,255,796 | A |   | 3/1981  | Gabbe et al. |
|-----------|---|---|---------|--------------|
| 4,558,302 | A | * | 12/1985 | Welch ........................ 341/51 |
| 4,899,147 | A | * | 2/1990  | Schiavo et al. .............. 341/60 |
| 5,201,048 | A |   | 4/1993  | Coulter et al. |
| 5,493,607 | A |   | 2/1996  | Arumainayagam et al. |
| 5,692,173 | A |   | 11/1997 | Chew |
| 5,781,772 | A |   | 7/1998  | Wilkinson, III et al. |
| 5,787,430 | A |   | 7/1998  | Doeringer et al. |
| 5,813,001 | A |   | 9/1998  | Bennett |
| 5,920,900 | A | * | 7/1999  | Poole et al. ................ 711/216 |
| 5,946,679 | A |   | 8/1999  | Ahuja et al. |
| 5,983,223 | A |   | 11/1999 | Perlman |
| 6,011,795 | A |   | 1/2000  | Varghese et al. |
| 6,014,659 | A |   | 1/2000  | Wilkinson, III et al. |
| 6,018,524 | A |   | 1/2000  | Turner et al. |
| 6,243,720 | B1 | * | 6/2001 | Munter et al. .............. 707/206 |
| 6,460,120 | B1 | * | 10/2002 | Bass et al. .................. 711/148 |
| 6,631,419 | B1 | * | 10/2003 | Greene ........................ 709/238 |

OTHER PUBLICATIONS

"A Simple Algorithm for the Longest–Prefix–Matching Problem," Research Disclosure—Sep. 1998/1281.
"IP Lookups Using Multiway and Multicolumn Search," Butler Lampson, Venkatachary Srinivasan and George Varghese, Associate Member, IEEE, IEEE/ACM Transactions on Networking, vol. 7, No. 3, Jun. 1999.
"Proceedings of the Seventeenth Annual ACM Symposium on Principles of Distributed Computing," Sponsored by: ACM Special Interest Group for Automata and Computability Theory and ACM Special Interest Group for Operating System Principles, ACM Press, Puerto Vallarta, Mexico, Jun. 28–Jul. 2, 1998.

* cited by examiner

*Primary Examiner*—Charles Rones
*Assistant Examiner*—Hassan Mahmoudi
(74) *Attorney, Agent, or Firm*—Bracewell & Patterson LLP (57) ABSTRACT

A method and system for finding a longest matching prefix for an input keyword from among multiple prefixes. The prefixes are data strings of varying lengths wherein prefixes of length n or greater are probabilistically a longest prefix match. The method of the present invention begins by mapping the prefixes of length greater than or equal to $n_1$, that is, in the interval $[n_1, L]$, into a first lookup system. Remaining prefixes of length less than $n_1$ but greater than or equal to $n_2$, that is, in the interval $[n_2, n_1-1]$, are mapped into a second index utilizing a second hash function, wherein $n_2$ is less than $n_1$. Further lookup systems on prefixes having lengths in the intervals $[n_3, n_2-1]$, $[n_4, n_3-1]$, and so on, may also be utilized, as determined by optimization studies and the statistics of routing tables.

15 Claims, 7 Drawing Sheets

HYBRID LONGEST PREFIX MATCH AND FIXED MATCH SEARCHES

BACKGROUND OF THE INVENTION

1. Technical Field

The present invention relates in general to prefix matching searches and, in particular to combining fixed matching with longest prefix matching techniques to improve search efficiency. More particularly, the present invention relates to utilizing a non-uniform statistical distribution of prefix length values within a network routing prefix table to divide the prefix table into two or more direct tables from which longest prefix searches can be performed.

2. Description of the Related Art

Many data processing or networking tasks require finding the longest matching binary sequence from a collection of stored binary strings. Specifically, such tasks require comparing an input keyword to a keyword that is stored in a database to find the longest match. The database that stores the keywords often includes a lookup table that, after establishing a match between an input keyword and a data string within the database, either retrieves information or executes a program linked to the data string.

In packet-based communication networks, which consists of multiple interconnected nodes, data in the form of packets can be sent from one node to any other node. Specialized nodes called routers are responsible for or "forwarding" a packet to its destination. By analogy, routers act as post offices. As letters, any of the data packets sent through a communication network contain information about the destination address, generally as part of a header. Each router compares this information or at least part of it with a list of addresses stored internally. If a match between a stored address and the destination address is found, the router establishes a path leading to the destination node. Depending on the size of the network and its structure, the packet is either directly forwarded to its destination or sent to another router, very much the same way a letter is passed through several post offices until reaching its final address.

One method for constructing large networks is promulgated by the International Organization for Standardization (ISO). Under this method, each router does not store routing information for every possible address in the network. Rather, it stores routing information for partial addresses. The ISO standard dictates that a router send a packet to the best matching partial address within its database. Implementing this standard requires building a hierarchical structure of nodes using a given number of digits or a given header length: Main routers are addressed by the initial part of the address, subrouters by the middle part, and final destination by the last digits of the address. It is then sufficient for any router to read digits assigned to the level of hierarchy to which a packet is to be sent. The ISO is thus a good example for illustrating the utility of having partial prefix matching ability.

Other useful applications of prefix matching include assigning an access/security level to a user of shared computer and network equipment, directory look-ups in a telephone context, on-line dictionaries, spelling checkers, and searching for reference numbers in large organizations, such as social security, health or other insurances, banking applications and the like.

The use of prefixes introduces a lookup problem in which multiple stored prefixes may match a given packet address. If a packet matches multiple stored prefixes, it is intuitive that the packet should be forwarded in accordance with instructions associated with the most specific or longest matching prefix.

Prefix matching lookup is particularly essential for high-speed packet forwarding over the Internet. As utilized herein, "the Internet" refers to the worldwide collection of networks that utilize the Transmission Control Protocol/Internet Protocol (TCP/IP) suite of protocols to communicate with one another. It is reasonable to expect further increases in users, hosts, domains, and thus to expect greater traffic management problems on the Internet.

IP currently supports a network routing protocol called IPv4 (Internet Protocol Version 4) that utilizes a 32-bit address in the header of each packet. For each packet received through an input link interface, a router reads the address field to determine the identity of the device (such as another router or host) to which the packet should be forwarded before reaching its final destination. routing table is typically utilized by a router to provide a searchable index between a packet address and the correct forwarding instruction. Exact matching is not feasible due to the resulting requirement of a routing table having $2^{32}$ entries for a 32-bit address. The routing table contains an array of address prefixes that each represent an address that is reachable from the router. After determining the optimum destination node, the router encodes the corresponding destination address into the address field of the packet and delivers the packet to a particular output link interface according to the encoded destination address.

This method of IP address lookup has become an increasingly critical delay bottleneck for Internet traffic. The problem will only get worse if IP addressing adopts longer addresses such as the 128-bit address required for the proposed IPv6 protocol.

From the foregoing, it can be appreciated that a need exists for an improved longest prefix matching technique in which statistical parameters associated with a given prefix length are advantageously utilized to simplify a search for a longest prefix match.

SUMMARY OF THE INVENTION

A method and system for finding a longest matching prefix for an input keyword from among multiple prefixes are disclosed herein. The prefixes are data strings of varying lengths wherein prefixes of length n or greater are probabilistically the longest prefix match. The method of the present invention begins by mapping the prefixes of length greater than or equal to $n_1$ into a first lookup system. Remaining prefixes of length less than $n_1$ but greater than or equal to $n_2$ are mapped into a second index utilizing a second hash function, wherein $n_2$ is less than $n_1$.

In a second embodiment, additional trees of even shorter prefixes are tested in additional lookups. Thus, there can be a third lookup mechanism used when prefixes of length shorter than $n_2$ exits, and so on.

All objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

Figure 1A:
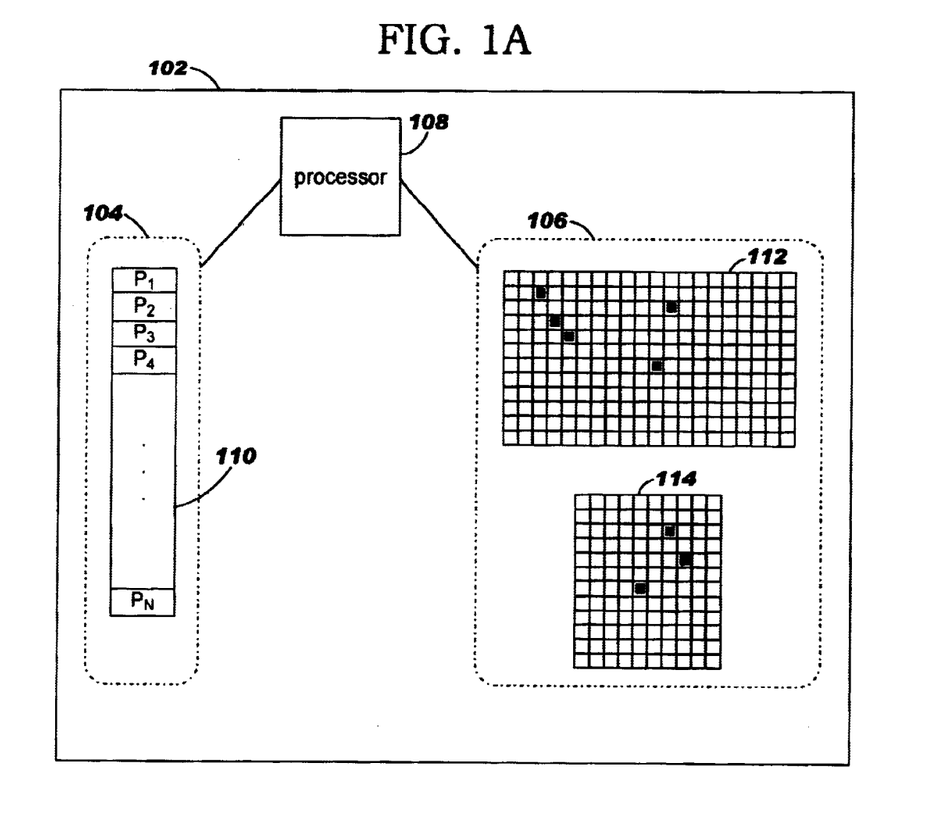
FIG. 1A illustrates a data processing system for sorting and mapping prefixes within a master prefix table to multiple direct tables in accordance with a preferred embodiment of the present invention.

With reference to FIG. 1A, there is illustrated a data processing system for mapping a master prefix table to a first and second index in accordance with a preferred embodiment of the present invention. In particular a prefix mapping system 100 is depicted within the context of a router 102. As utilized herein, a "router" refers to an intermediary device within a packet-based communications network that expedites message delivery. On a single network that connects multiple data processing systems through a mesh of possible connections, a router receives transmitted messages and forwards them to their correct destination over the most efficient available route.

For purposes of illustration, it will be assumed with reference to the figures, that the longest prefix matching system and method taught herein is performed with respect to routing data packets at the network level of the well known ISO/OSI architecture model. The routers described herein thus process and forward data packets utilizing the well known internet protocol (IP). IP Version 4 (IPv4), the current version of IP, supports in principle $2^{32}$ or about 5 billion internet addresses. The header of an IP packet that is addressed in accordance with IPv4 protocol includes a 32-bit destination address. A new version of IP, IPv6, provides a 128-bit destination address within the packet header. IPv6 may come into widespread use to alleviate the service shortcomings of IPv4. It should be noted that although the particular number of address bits does not limit the applicability of the principle of present invention, the utility enjoyed therefrom increases as the number of address bits increases.

As further depicted in FIG. 1A, router 102 includes a processor 108 for performing a variety of data processing tasks associated with incoming and outgoing data packets. A memory device 104, that in the depicted embodiment may be a volatile or non-volatile storage device, stores a master routing table 110. A routing table such as routing table 110 is conventionally utilized as a database for storing a variety of prefixes having a length that may theoretically range from 1 bit to the bit length of an address header for packets routed by router 102.

In practice, an IP prefix lookup table, such as router table 110, includes prefixes having lengths that vary between 8 and 32 bits wherein 32 bits is the length of a packet address. For each packet received through an input link interface, router 104 reads the address field to determine the identity of the device (another router or host) to which the packet should be forwarded on its way to its final destination. In accordance with standard IP routing convention, in order to properly forward an incoming IP packet, a longest prefix match (LPM) search must be conducted on the prefixes listed within router 110. The goal of an LPM search is to find the longest prefix that matches the leading bits of a packet address exactly.

The LPM problem can be defined generally as follows. A large number of bit patterns (called prefixes or routes) of various lengths are stored within a master database. Associated with each bit pattern is an action. For the IPv4 protocol, an input address X in the form of a 32-bit IP destination address is presented to the LPM search system which must find among all the stored patterns, the longest pattern having a lenght l, wherein all l bits exactly match the leftmost l bits of the input address X. The action associated with this longest pattern is then implemented with respect to the input address X.

In the embodiment illustrated in FIG. 1A, the action associated with the prefixes stored within routing table 110 is embodied as a forwarding instruction for instructing processor 108 for routing an incoming packet to a particular destination. Routing table 110 is thus utilized by router 102 to provide a searchable index between a packet address and the correct forwarding instruction. Exact matching is not feasible due to the resulting requirement of a routing table having $2^{32}$ entries. After determining the optimum destination node, processor 108 encodes the corresponding destination address into the address field of the packet and delivers the packet to a particular output link interface according to the encoded destination address.

As further illustrated in FIG. 1A, router 102 further includes a first index 112 and a second index 114 stored within a memory device 106. As shown in FIG. 1A, both indexes include an array of entries. The shaded entries represent data storage locations having particular addresses in which data in the form of one or more prefixes have been entered. In a preferred embodiment, first index 112 includes $2^{m_1}$ available storage locations and thus has an $m_1$-bit storage access address (note that only five locations actually have prefix entries in this example).

Second index 114 has an $m_2$-bit address to accommodate its $2^{m_2}$ storage locations. As with first index 112, most of the available storage locations within second index 114 are unoccupied. The shaded entries within second index 114 represent data storage locations in which one or more prefixes are stored.

The prefixes stored within first index 112 and second index 114 includes all the prefixes contained within routing table 110. In accordance with an important feature of the present invention, processor 108 maps each of the prefixes within routing table 110 to either first index 112 or second index 114 in accordance with a prefix length parameter. In a preferred embodiment, this prefix length parameter is a prefix length (in terms of a number of bits) that has been statistically determined to be to the most likely to be selected as a longest prefix match from among all prefixes within routing table 110. In actual IPv4 routing tables, this value is 16. Alternatively, this prefix length might be the length most represented by all stored prefixes. In actual IPv4 routing tables, this value is 24.

Specifically, such a prefix length parameter may be determined by a statistical analysis of empirical longest matching prefix data. Trends in prefix lengths among the prefixes within routing table 110 may also be utilized to determine an appropriate prefix length parameter. For purposes of illustration, it will be assumed that the address length is L bits. Furthermore, it will be assumed with reference to the figures herein that the determined prefix length parameter is represented by a non-zero integer $n_1$. In this case $n_1$ represents the data string length (in terms of a number of bits) of a prefix that, for example, may be statistically determined to be the most likely to be a longest prefix match or the most frequently occurring length, for an input keyword from among all prefixes stored within routing table 110. Within the scope of the present invention, additional shorter lengths that are statistically significant in some way, namely, $n_2$, $n_3$, ..., $n_k$ for some positive integer k are also utilized for performing a LPM for a given address. It should be noted that $L \geq n_1 > n_2 > ... > n_k > 0$.

It is assumed that all stored prefixes have lengths included within the interval $[n_k, L]$. This interval will be partitioned into k sub-intervals, namely, $[n_1, L], [n_2, n_1-1] ... [n_k, n_{k-1}-1]$. To accommodate $n_1$-bit indexing, first index 112 is a storage array having $2^{N1}$ data storage locations that each have an $n_1$-bit address. The prefixes within routing table 110 are first sorted into prefixes of length greater than or equal to $n_1$ and prefixes of length less than $n_1$. Processor 108 maps the prefixes of length greater than or equal to $n_1$ into first index 112. This mapping is performed utilizing an $n_1$-bit hash function. If X is the raw 32-bit address, then let $h_1(x)$ be the $m_1$-bit value of the hash function. This value ($h_1(x)$) depends only on the first $n_1$ bits of X. In one embodiment of the present invention, the value of $h_1(x)$ is simply the first $n_1$ bits of X such that $n_1 = m_1$. It should be noted that since many of the prefixes mapped into first index 112 have lengths greater than $n_1$, "collisions" may occur in which more than one prefix maps into a single entry within first index 112. As described with reference to FIG. 1C below, a data tree structure is utilized to organize more than one prefix stored within a single index entry.

Prefixes within routing table 110 of length less than $n_1$, are sorted by processor 108 into second lookup system 114 for prefixes of length within the interval $[n_2, n_1-1]$. In accordance with a preferred embodiment, a longest prefix match search for a 32-bit IP packet address is performed first with respect to first lookup system 112. If a match is found within first lookup system 112, the object packet is forwarded in accordance with a forwarding instruction associated with the matching prefix. If a match is not found within first lookup system 112, the search is continued with respect to second lookup system 114. In lookup system 114, a second hash function $h_2(X)$ is utilized. If X is the raw 32-bit address, then let $h_2(X)$ be the $m_2$-bit value of the hash function. This value $h_2(X)$, depends only on the first $n_2$ bits of X. In one embodiment of the present invention, the value of $h_2(X)$ is simply the first $n_2$ bits of X such that $n_2 = m_2$. This sequence may be extended to k lookup systems with prefixes of length $[n_1, L], [n_2, n_1-1] ... [n_k, n_{k-1}-1]$, and k hash functions $h_1$, $h_2$ ..., $h_k$ with output values of $m_1, m_2, ..., m_k$ bits respectively.

Figure 1B:
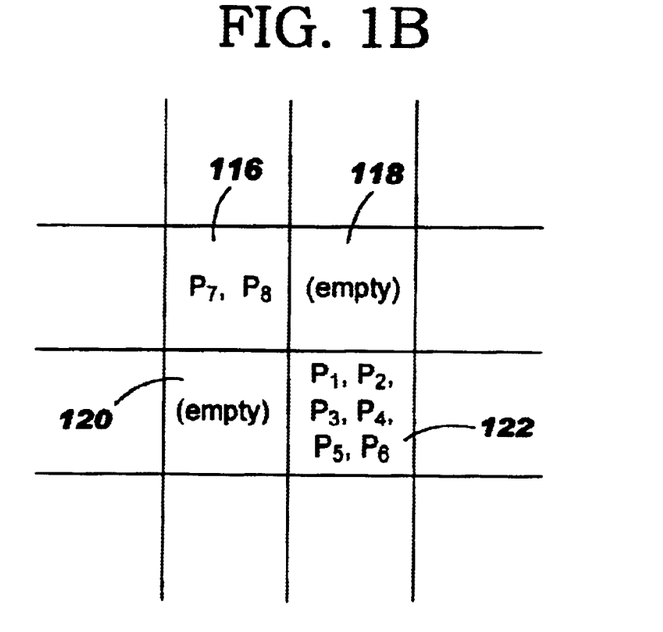
FIG. 1B depicts a portion of a prefix lookup table constructed in accordance with the teachings of the present invention.
Figure 1C:
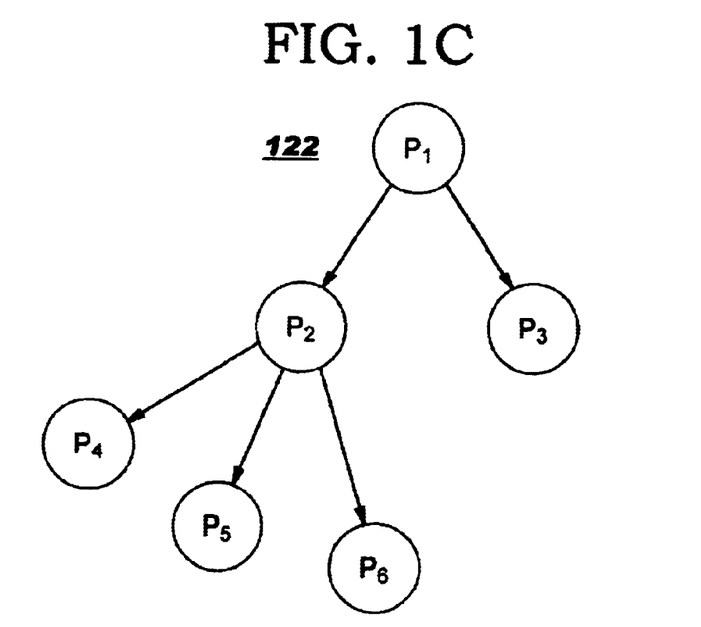
FIG. 1C illustrates prefixes mapped within a prefix table in a data tree structure in accordance with the teachings of the present invention.

Turning now to FIGS. 1B and 1C, there is depicted the manner in which individual prefix index entries are structured to accommodate an index search in accordance with a preferred embodiment. With reference first to FIG. 1B, a portion of a prefix index 150 is illustrated. The construction of prefix index 150 is consistent in principle with either first index 112 or second index 114. As shown in FIG. 1B, four entries of prefix index 150 are illustrated. Two of the entries, 116 and 122 are includes mapped prefixes while entries 118 and 120 are unoccupied. All of the prefixes $P_1-P_8$ having a data string length of at least x, wherein prefix index has an x-bit addressing to accommodate $2^x$ storage locations. As shown in FIG. 1B, entry 116 stores prefixes $P_7$ and $P_8$, while entry 122 stores prefixes $P_1-P_6$.

A mapping function implemented by processing means such as processor 108 within router 102 is utilized to map prefixes $P_1-P_6$ and $P_7-P_8$ to entries 122 and 116 respectively. In accordance with a preferred embodiment of the present invention, the mapping function processes the first x bits of a given prefix such that a unique storage location within prefix index 150 is allocated for each unique x-bit string processed by the mapping function.

Referring to FIG. 1C, a data structure arrangement for entry 122 containing prefixes $P_1-P_6$ is illustrated. Specifically, $P_1-P_6$ are arranged in a data tree structure in which pointers are embedded to provide a suitable search structure for multi-prefix entries (such as entries 122 and 116) that index more than one prefix. As shown in FIG. 1C, the data tree structure of entry 122 includes $P_1$ as the root node, $P_2$ and $P_3$ as branches and $P_4$, $P_5$, and $P_6$ as leaves. This hierarchical arrangement corresponds to the relative lengths of $P_1-P_6$ in that $P_1$ is the shorter than $P_2$ and $P_3$, while $P_4$, $P_5$, and $P_6$ are the longest prefixes within entry 122. The data tree structure for entry 122 provides a convenient means for performing a longest prefix match search following the full match search utilized to identify entry 122. Hence, prefixes $P_1-P_6$ (having lengths greater than or equal to x) all shares a common x-bit "subprefix." Prefixes $P_7$ and $P_8$ also share a unique x-bit subprefix with respect to entries 118, 120, and 122.

Figure 2:
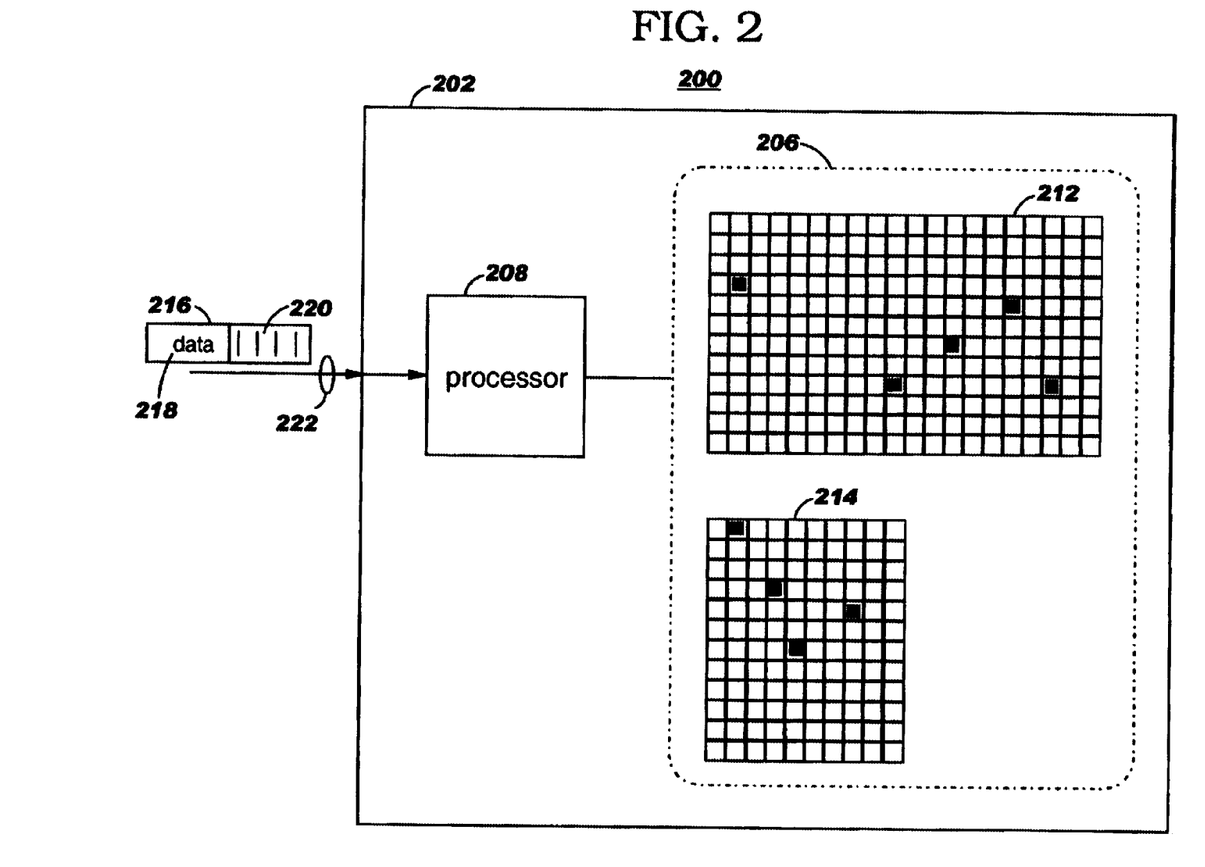
FIG. 2 depicts a system within a network router for processing an IP address header in accordance with a preferred embodiment of the present invention.

With reference now to FIG. 2 there is depicted a hybrid search system 200 for processing an IP address header in accordance with a preferred embodiment of the present invention. As shown in FIG. 2, hybrid search system is implemented within a network router 202 similar to that depicted in FIG. 1A.

Router 202 includes an input port 222 at which an input IP packet 216 is received for forwarding. IP packet 216 includes a data section 218 and an address header 220 that, depending on whether IPv4 or IPv6 protocol is being utilized, includes a 32-bit or 128-bit destination address. Since the principle described herein does not depend on a particular address length, an address length of L-bits will be associated with the destination address within address header 220.

Router 202 further includes a master routing table (not depicted in FIG. 2) in which all routing prefixes are stored. Such prefixes range in length from one to L bits. It should be noted that in IPv4 routing tables today, the shortest occurring length is typically 8 bits. As described with reference to FIGS. 1A, 1B, and 1C, the prefixes are sorted into prefixes of length $[n_1, L], [n_2, n_1-1], ..., [n_k, n_{k-1}-1]$.

As further illustrated in FIG. 2, a memory device 206 within router 202 stores a first index 212 and a second index 214. First index 212 is constructed in the manner described for prefix indices 112 of FIG. 1A in which processor 208 maps prefixes of length greater than or equal to $n_1$ into first lookup system 212 using an $m_1$-bit hash index $h_1$. The remaining prefixes having lengths less than $n_1$ are similarly mapped into other lookup systems such as second lookup system 214.

Upon receipt of IP packet 216 by router 202, processor 208 reads the L-bit destination address X within address header 220 in preparation for a hybrid prefix matching search. First, the L-bit destination address X is hashed into an $m_1$-bit index, $h_1(X)$. The hash function $h_1$ is selected such that the hash function output, $h_1(X)$, depends only on the first $n_1$ bits of X. A full match search is thus performed in which the first $n_1$ bits of X are used as an $m_1$-bit index to locate a single entry in a lookup table within lookup system 212. If the located table entry in the lookup table within lookup system 212 is occupied by at least one prefix, a longest prefix match (LPM) search is initiated within the located entry to determine the longest matching prefix for the L-bit address.

If the located lookup table entry within first lookup system 212 is found to be vacant, a second full match search is initiated with respect to second lookup system 214. The same hash function, $h_2$, that was utilized to map prefixes having lengths less than $n_1$, is now utilized to map the first $n_2$ bits of X into an $m_2$-bit index that corresponds to a single entry in the lookup table within lookup system 214. The entry corresponding to $h_2(x)$ within second lookup system 214 may contain one or more possible matching prefixes or, if there are no prefixes having a length between $n_1$ and $n_2$, may be empty. A LPM search is initiated if the located second index entry includes more than one prefix.

Figure 3A:
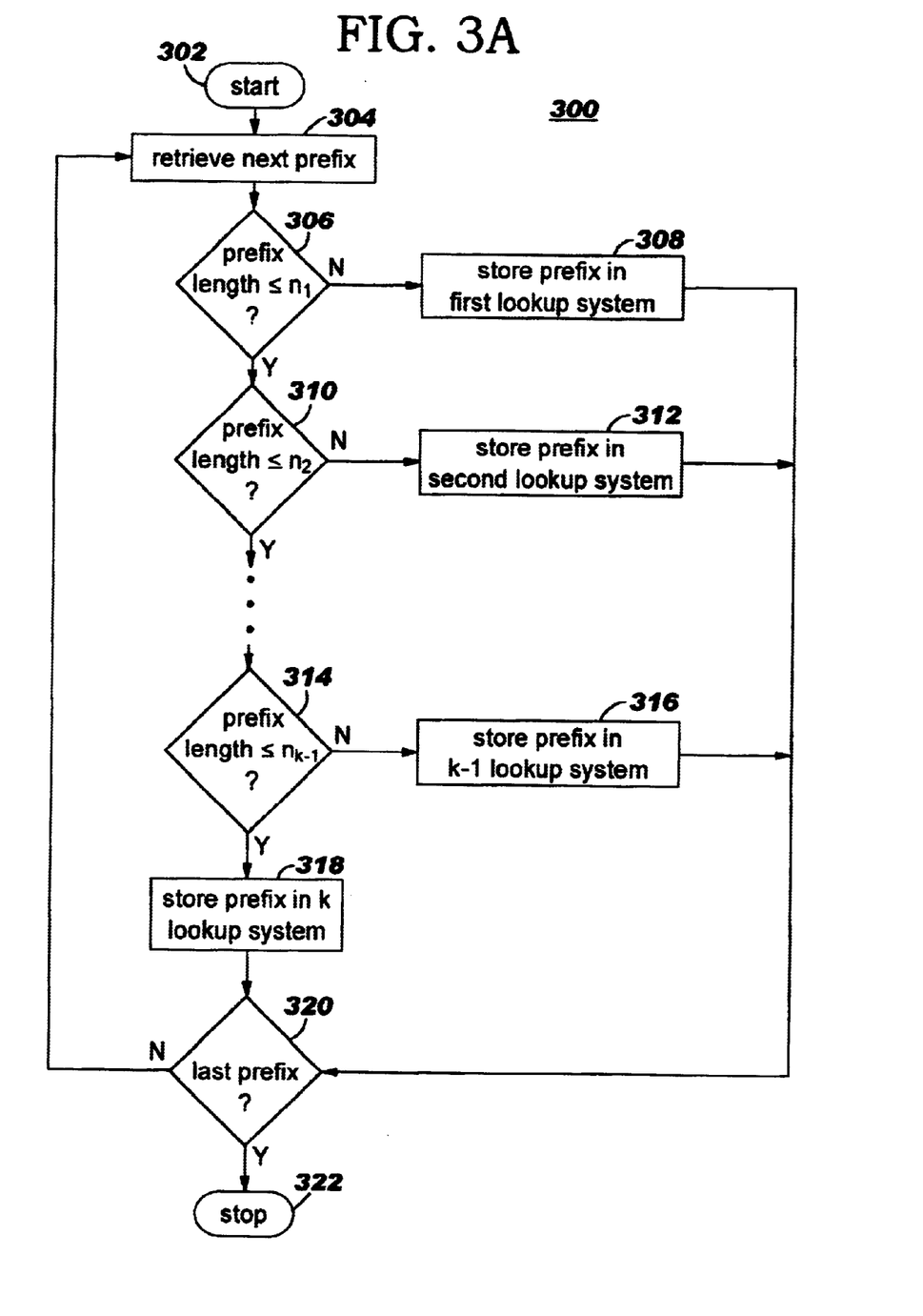
FIG. 3A is a flow diagram illustrating a method by which prefixes are sorted in accordance with a preferred embodiment of the present invention.

Referring now to FIG. 3A, there is depicted a flow diagram illustrating sorting steps performed by the sorting system 100 of FIG. 1A in accordance with a preferred embodiment of the present invention. Specifically, FIG. 3A depicts a method by which prefixes of length $[n_i, n_{i-1}-1]$ are selected to be indexed within a lookup system i. The sorting system is initialized as shown at step 302 to begin mapping the stored prefixes within the master routing table into k lookup tables. As depicted at step 304, a next prefix is retrieved from routing table 110. Next, as illustrated at step 306, a determination is made of whether or not the retrieved prefix has a bit length greater than or equal to $n_1$.

If the retrieved prefix is greater than or equal to $n_1$, and as depicted at step 308, hash function $h_1$ (as previous described) is utilized to process the first $n_1$ bits of the retrieved prefix in order to map the prefix to a $m_1$-bit output, wherein $m_1 \leq n_1$, that corresponds to a unique table entry within a first lookup table, such as first lookup table 212. It should be noted that hash function $h_1$ has an index $h_1(X)$ that depends only on the first $n_1$ bits of the prefix.

Figure 3B:
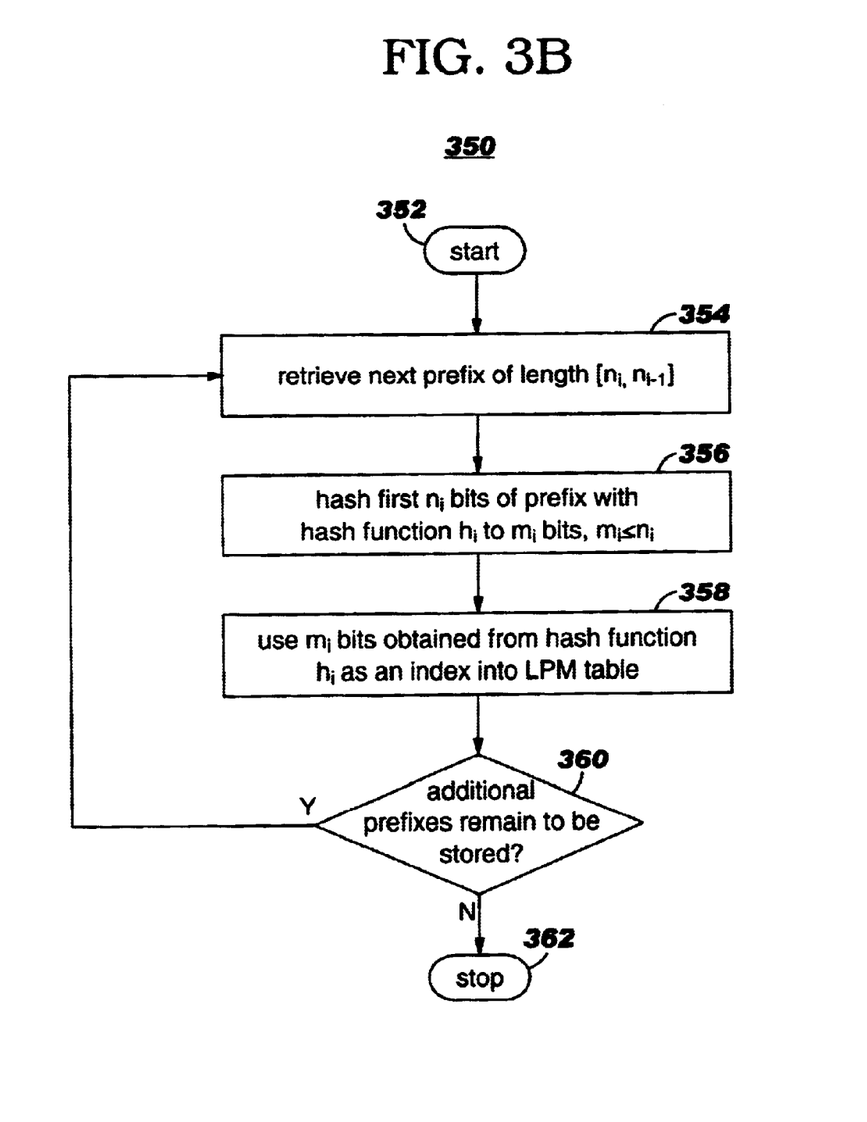
FIG. 3B is a flow diagram illustrating a method by which prefixes are mapped from a master routing table into multiple direct search tables in accordance with a preferred embodiment of the present invention.

The steps performed during the storage interval shown at step 308 (as well as steps 312 and 316) are illustrated with reference to FIG. 3B. The storage interval begins at step 352 and proceeds to step 354 which depicts retrieval of a prefix having a bit length within the range $[n_i, n_{i-1}-1]$. In the context of step 308, for example, i=1 and $n_{i-1}$ represents the longest prefix length L stored within the master routing table (32 bits for IPv4).

Next, as depicted at steps 356 and 358 a hash function $h_i$ is utilized to process the first $n_i$ bits into an $m_i$-bit output value which is then utilized as an index into a lookup table.

In a preferred embodiment, the lookup table is a LPM table having $2^{mi}$ addressable storage locations. Also in a preferred embodiment, the LPM table includes data tree structures for organizing multiple prefixes store are structured in a manner similar to that depicted in FIG. 1B. This mapping process iterates as shown at step 360 until all prefixes within the range $[n_i, n_{i-1}-1]$ have been retrieved and mapped as depicted at steps 354, 356, and 358. This mapping process is performed for each of steps 308, 312, and 316 in FIG. 3A.

Hash function $h_1$ may be any of variety of possible hash functions, with only the requirement that the function produce a unique output (one particular entry among $2^{m1}$ possible storage locations). For example, if search index $m_1$ is 16, and if hash function $h_1$ is simply the first 16 bits of the prefix, then a first index having an array of $2^{16}$ storage locations and a 16-bit address is required. In fact, a particularly convenient hash function for mapping prefixes of length greater than or equal to 16 into the first index would be an identity function in accordance with the following relation: $h_1(x)$=first 16 bits of x. The result of utilizing such an identity hashing function is that the prefix is mapped to an entry that has a 16-bit address matching the first 16 bits of the prefix.

Turning back to FIG. 3A, if, as illustrated at step 310, the retrieved prefix has a length less than $n_1$, a further determination is made of whether or not its bit length is greater than or equal to $n_2$. If so, and as shown at step 312, a second hash function $h_2$ is utilized to map the prefix into an $m_2$-bit index within a second lookup table that has $2^{m2}$ addressable storage locations. Hash function $h_2$ produces an $m_2$-bit index output value, $h_2(x)$, that depends only on the first $n_2$ bits of the prefix, wherein $m_2 \leq n_2$. Step pairs analogous to steps 306/308 and steps 310/312 continue until, as depicted at step 314, a final sorting iteration is performed for prefixes having lengths less than $n_k$ but greater than or equal to $n_{k-1}$.

After all prefixes having lengths less than $n_{k-1}$ have been indexed into k−1 lookup tables, the sorting process has terminated and the remaining prefixes are stored in a $k^{th}$ lookup table as illustrated at step 318. Upon reaching step 322 all routing prefixes within the master routing table have been sorted and indexed accordingly into k lookup tables.

Figure 4:
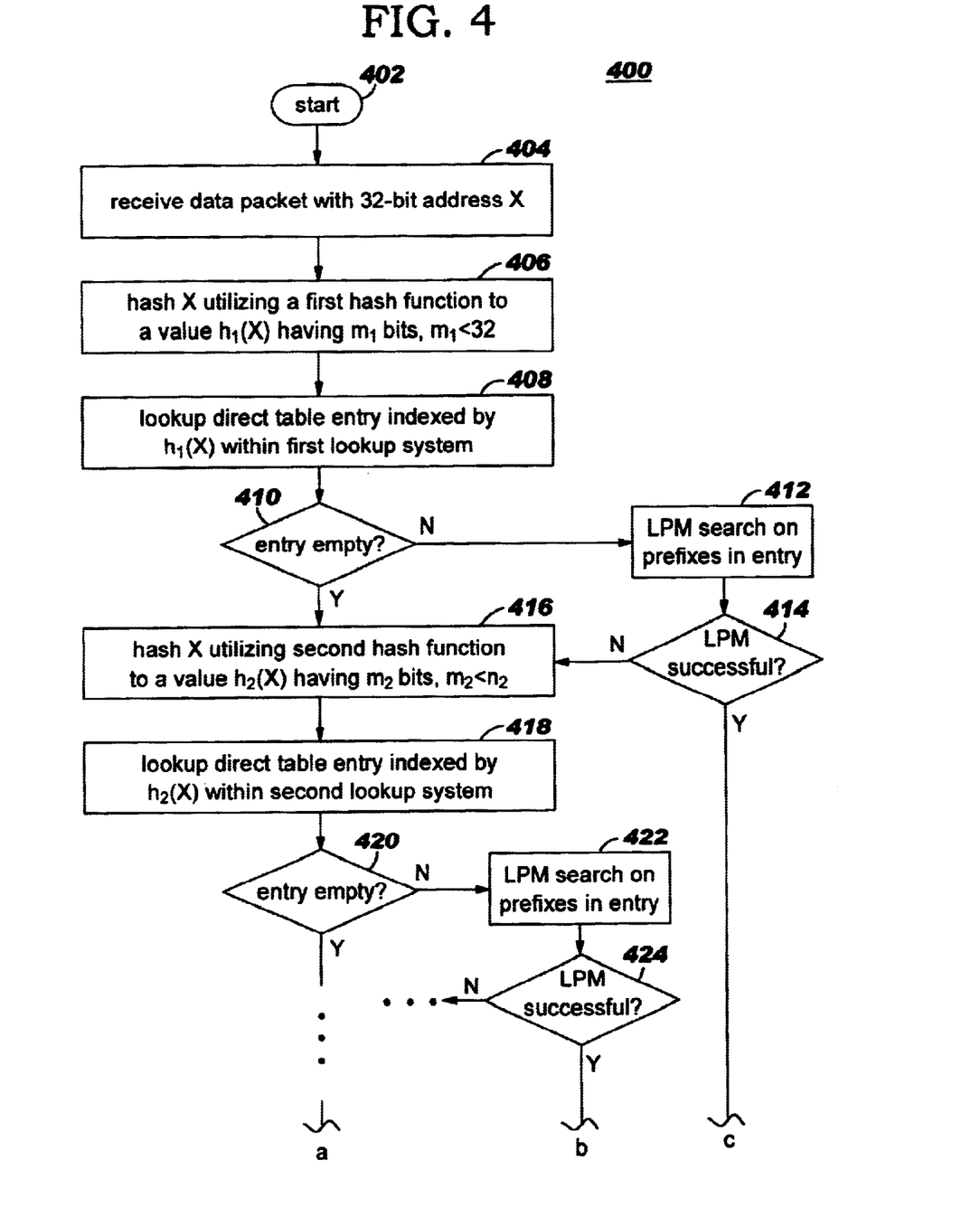
FIG. 4 is a flow diagram depicting steps performed by an address lookup processing system in accordance with a preferred embodiment of the present invention.

With reference now to FIG. 4 there is illustrated a flow diagram depicting steps performed by hybrid search system 200 for processing an IP address in accordance with a preferred embodiment of the present invention. Following initialization of hybrid search system 200 as depicted at step 402, an IP address is received by processor 208 as shown at step 404. In accordance with the teachings of the present invention, the IP address received at step 404 is an L-bit data string included within a packet address.

Proceeding to step 406, the first (leftmost) $n_1$ bits of X are hashed utilizing the same hash function, $h_1$, that was used to map prefixes having lengths greater than or equal to $n_1$ into the first lookup table. The result of hashing address string X using $h_1$ is an $m_1$-bit output $h_1(X)$. Next, as shown at step 408, a matching index entry within the first lookup table is identified in accordance with the hash output $h_1(X)$.

Many of the entries within the first lookup table are empty while others contain more than one mapped prefix. Step 410 depicts an inquiry to determine whether or not the matching entry identified at step 408 includes at least one prefix (previously mapped in accordance with the mapping process depicted in FIG. 3B). If the identified lookup table entry does include at least one mapped prefix, a LPM search is conducted with respect to the entry to determine the longest mapped prefix that matches the IP address string (step 412).

The search conducted at step 412 consists of searching by use of a Patricia tree within the located lookup table entry for the longest prefix that matches the first (leftmost) 1 bits of address string X. The LPM search depicted at step 412 is successful if at least one prefix match is found. In response to a determination at step 414, that the LPM search was successful the address lookup process terminates at step 444. If not, the process continues as depicted at step 416.

If, as illustrated at step 416, either the identified first index entry is empty or the LPM search was unsuccessful, address string X is hashed utilizing a second hash function, $h_2$, into an $m_2$-bit value $h_2(X)$, wherein $m_2 < n_2$. As explained with reference to FIG. 3A, $n_2$ is the prefix bit length selected as the lowermost boundary for the second lookup table in which prefixes within the range $[n_2, n_1-1]$ have been sorted and mapped in accordance with the method illustrated in FIGS.'s 3A and 3B.

Next, as depicted at step 418, $h_2(X)$ is utilized as the index by which a direct table lookup is performed on the second lookup table. A unique table entry indexed (addressed) by $h_2(X)$ is located as a result of the lookup illustrated at step 418. Following the lookup at step 418, steps 420, 422, and 424 mirror steps 410, 412, and 414 as described above except that the second lookup table rather than the first is the object of an LPM search if the entry located at step 418 contains at least one stored prefix.

The embodiment depicted in FIG. 4 assumes that the prefixes stored within the master routing table have been sorted and mapped into at least three direct lookup tables. The address lookup processing steps 406, 408, 410, 412, and 414 are repeated as illustrated by steps 426, 428, and 430 for any intermediate lookup tables before arriving at the final lookup system k.

If a LPM has not been determined upon processing of address X with respect to the $(k-1)^{th}$ lookup system in accordance with the lookup processing illustrated at steps 426, 428, and 430, address string X is hashed utilizing a $k_{th}$ hash function, $h_k$, into an $m_k$-bit value $h_k(X)$, wherein $m_k < n_k$ (step 432). The $n_k$ bit length parameter is the prefix bit length selected as the lowermost boundary for the $k^{th}$ lookup table in which prefixes within the range $[n_k, n_{k-1}-1]$ have been sorted and mapped in accordance with the method illustrated in FIGS.'s 3A and 3B.

Next, as depicted at step 434, $h_k(X)$ is utilized as the index by which a direct table lookup is performed on the $k^{th}$ lookup table. A unique table entry indexed (addressed) by $h_k(X)$ is located as a result of the lookup illustrated at step 434. Following the lookup at step 434, steps 438 and 440 depicts a LPM search commenced in response to a determination at step 436 that the entry contains at least one prefix. If the entry is empty or if the LPM is unsuccessful, then the LPM for address X has failed entirely, and as illustrated at step 442 a default action is initiated before the process terminates at step 444.

Preferred implementations of the invention include implementations as a computer system programmed to execute the method or methods described herein, and as a program product. According to the computer system implementation, sets of instructions for executing the method and system of the present invention are resident in a storage device such as the ROM or RAM of one or more computer systems. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps described within reference to the figures can be accomplished with a computer-aided device. In such a method, data stored in a memory unit of a data-processing system such as a data-processing system, can represent steps in a method for implementing a preferred embodiment of the present invention.

While the invention has been particularly shown and described with reference to a preferred embodiment, it will be understood by those skilled in the art that various changes in form and detail may be made therein without departing from the spirit and scope of the invention.

What is claimed is:

1. A method for finding a matching prefix for an input binary data string from among a plurality of prefixes having varying lengths, said method comprising:

generating a first lookup table for said plurality of prefixes having a length greater than or equal to $n_1$ bits by utilizing a first hash function;

generating a second lookup table for said plurality of prefixes having a length less than $n_1$ bits by utilizing a second hash function, wherein said second hash function is different from said first hash function;

applying said first hash function to a prefix of said input binary data string to yield an $m_1$ bit index;

determining whether or not said first lookup table includes a match by utilizing said $m_1$ bit index;

in response to a determination that said first lookup table does not include a match, applying said second hash function to said prefix of said input binary data string to yield an $m_2$ bit index; and determining whether or not said second lookup table includes a match by utilizing said $m_2$ bit index.

2. The method of claim 1, wherein said method further includes performing a routine for handling a non-matching prefix for said input binary data string, in response to a determination that said second lookup table does not include a match.

3. The method of claim 1, wherein said method further includes identifying a matching prefix for said input binary data string within said first lookup table, in response to a determination that said first lookup table includes a match.

4. The method of claim 1, wherein said method further includes identifying a matching prefix for said input binary data string within said second lookup table, in response to a determination that said second lookup table includes a match.

5. The method of claim 1, wherein said method is performed by a router.

6. A computer program product residing on a computer usable medium for finding a matching prefix for an input binary data string from among a plurality of prefixes having varying lengths, said computer program product comprising:

program code means for generating a first lookup table for said plurality of prefixes having a length greater than or equal to $n_1$ bits by utilizing a first hash function;

program code means for generating a second lookup table for said plurality of prefixes having length less than $n_1$ bits by utilizing a second hash function, wherein said second hash function is different from said first hash function;

program code means for applying said first hash function to a prefix of said input binary data string to yield an $m_1$ bit index;

program code means for determining whether or not said first lookup table includes a match by utilizing said $m_1$ bit index;

program code means for applying said second hash function to said prefix of said input binary data string to yield an $m_2$ bit index, in response to a determination that said first lookup table does not include a match; and program code means for determining whether or not said second lookup table includes a match by utilizing said $m_2$ bit index.

7. The computer program product of claim 6, wherein said computer program product further includes program code means for performing a routine for handling a non-matching prefix for said input binary data string, in response to a determination that said second lookup table does not include a match.

8. The computer program product of claim 6, wherein said computer program product further includes program code means for identifying a matching prefix for said input binary data string within said first lookup table, in response to a determination that said first lookup table includes a match.

9. The computer program product of claim 6, wherein said computer program product further includes program code means for identifying a matching prefix for said input binary data string within said second lookup table, in response to a determination that said second lookup table includes a match.

10. The computer program product of claim 6, wherein said computer program product is executed within a router.

11. An apparatus capable of finding a matching prefix for an input binary data string from among a plurality of prefixes having varying lengths, said apparatus comprising:

means for generating a first lookup table for a plurality of prefixes having a length greater than or equal to $n_1$ bits by utilizing a first hash function;

means for generating a second lookup table for a plurality of prefixes having a length less than $n_1$ bits by utilizing a second hash function, wherein said second hash function is different from said first hash function;

means for applying said first hash function to a prefix of said input binary data string to yield an $m_1$ bit index;

means for determining whether or not said first lookup table includes at least one matching prefix by utilizing said $m_1$ bit index;

means for applying said second hash function to said prefix of said input binary data string to yield an $m_2$ bit index, in response to a determination that said first lookup table does not include a match; and means for determining whether or not said second lookup table includes a match by utilizing said $m_2$ bit index.

12. The apparatus of claim 11, wherein said apparatus further includes means for performing a routine for handling a non-matching prefix for said input binary data string, in response to a determination that said second lookup table does not include a match.

13. The apparatus of claim 11, wherein said apparatus further includes program code means for identifying a matching prefix for said input binary data string within said first lookup table, in response to a determination that said first lookup table includes a match.

14. The apparatus of claim 11, wherein said apparatus further includes program code means for identifying a matching prefix for said input binary data string within said second lookup table, in response to a determination that said second lookup table includes a match.

15. The apparatus of claim 11, wherein said apparatus is located within a router.

* * * * *